Patented Apr. 12, 1949

2,466,710

UNITED STATES PATENT OFFICE 2,466,710

BLOOD PRODUCT CONTAINING OXIDIZED HEME AND METHOD FOR PREPARING SAME

Havard L. Keil, Clarendon Hills, and Raymond H. Borkenhagen, Chicago, Ill., assignors to Armour and Company, Chicago, Ill., a corporation of Illinois No Drawing. Application October 17, 1945, Serial No. 622,938

11 Claims. (Cl. 260—314)

This invention relates to a blood product and processes for preparing the same. More particularly the invention deals with a light colored blood product and processes for removing the deep red color normally associated with products containing hemoglobin.

In normal slaughtering operations it has been common practice to allow the blood of the slaughtered animals to fall to the floor and pass through floor drains to a collection tank. The blood so collected is coagulated and pressed to obtain a solid portion which is dried and incorporated in fertilizers. The blood so collected is opaque and deep red in color, and though attempts have been made to find more useful outlets for it in industry, such attempts have substantially failed and the only outlet for any large volume of such floor blood has been in fertilizer.

In another type of operation the blood of beef animals is caught in a special manner and preserved by an anti-coagulant until it can be subjected to a centrifuging operation. In the centrifuging operation a dark portion containing the heavier red cells is separated from a lighter portion which is substantially free of red cells. This lighter fraction, which is a light pink or straw color, is dried and used in industry for finishing leather, for treating textiles, for clarification of chemicals, etc. The light colored fraction, which is free of the hemoglobin containing red cells, is available for such purposes; but the whole blood, or the dark colored fraction, is not suited to these uses because of its color.

Blood which is to be centrifuged must be preserved in an uncoagulated state and rupture of red cells must be avoided, since if the cells become ruptured the hemoglobin is released throughout the liquid and separation by centrifugal means is impossible. Therefore, the blood for centrifuging must be collected in a special manner, using containers or liquid systems which will accommodate anti-coagulating agents, and such practice has been considered practical only in a limited way in the slaughtering of beef animals.

The industry has long sought a method for processing whole blood and for treating the hemoglobin contained therein to produce a light colored protein product.

Prior attempts to bleach hemoglobin have met with failure and no practical means for altering the deep red color has heretofore been available.

We have now discovered that, while hemoglobin is resistant to bleaching treatment, the heme or pigment structure of the hemoglobin molecule when dissociated from the globin or protein structure is responsive to bleaching action by oxidizing agents. Apparently the association of the globin structure has heretofore operated to protect alteration of the heme against changes necessary for bleaching, and by loosing bonds between the heme and the globin, the heme is left unprotected against alteration by oxidizing agents. By subjecting the heme while dissociated from the globin to the action of an oxidizing agent, the deep red color fades and the color of the product becomes substantially lighter. In this way it is possible to prepare a thoroughly bleached blood product which is straw colored or almost clear, and which has just as favorable a color as is had by the protein product obtained in the centrifuging process by which the hemoglobin is removed. The corresponding aqueous solution of blood plasma proteins obtained by the centrifuging process has a color which is usually not less than 13 on the Gardner (1933) standard liquid color scale.

Our improved process is applicable to blood from any source. It is commercially valuable especially for the treatment of the blood of cattle, hogs, and sheep, the blood being obtained from the killing departments of the slaughtering houses. In collecting the blood for treatment in our process, no special care is necessary and the bleaching effect is obtained whether or not the red blood cells become ruptured in the catching operation, and whether or not the blood contains moisture or impurities, and whether or not the blood has clotted and drained from the fibrin or clotting elements. The process is particularly adapted to the treatment of blood known as "floor blood" which has been allowed to fall on the packinghouse floor and has drained to a collection tank, this floor blood being heretofore a low grade, low priced product. The process is also applicable to the hemoglobin fraction obtained in the centrifuging process or to any product containing hemoglobin.

The heme or pigment structure of the hemoglobin may be dissociated from the protein in various ways. One way to accomplish this is by adjusting the pH of the blood to the acid side. Acid may be added until the pH is preferably of the order of 3.5–2.5. Under such acid condition the heme is dissociated from the globin so as to be susceptible to attack by oxidizing agents. Any of the well known mineral or organic acids may be used in this connection. Hydrochloric acid has been found quite satisfactory.

Another way involves adjusting the pH to the alkaline side of the addition of an alkali. Any alkali material may be added, such as sodium hydroxide, until the pH is well above 7, preferably of the order of 11-12. Under this alkaline condition the heme is sufficiently dissociated from the globin to be subject to attack by oxidizing agents.

Yet another way of dissociating the heme from the globin is by heating the blood to about 55-65° C. We find it preferable to combine the alkali treatment and heating, since this practice leaves the protein in a more native state with respect to water solubility and heat coagulability. When heat is employed along the with the alkali treatment, it is not necessary to use quite as much alkali, the preferable range being from pH 9-12.

Heating may also be combined with the acid treatment, it being preferable to carry out such process by adjusting the pH of the hemoglobin to from 3.5-2.5 to dissociate the heme from the globin, heating the resulting mixture thus adjusted as to pH to a temperature of from 55-65° C., and subjecting the resulting heme while dissociated from the globin to the action of a peroxide.

When the blood material has been conditioned for bleaching by the adjustment of pH to either the acid or alkaline side, or by heat treatment, or by other means, the heme is subjected to the action of an oxidizing agent. We may use any oxidizing agent, such as hydrogen peroxide, sodium peroxide, barium peroxide, or the like. Hydrogen peroxide is preferred since it does not leave a salt residue, and therefore does not add to the salt content of the bleached product.

The oxidizing agent may be added to the conditioned blood material and mixed so that it is brought into efficient contact with the heme pigment. This brings about a pronounced lightening of the red color, and if the conditioning and bleaching steps are effectively performed the product may be a substantially colorless liquid. If there is a tendency for too much foaming during the mixing step, a small quantity of a defoaming agent, such as tributyl phosphate, may be added prior to the mixing step.

In some cases a complete bleaching effect may not be desired, and in such cases a lesser amount of the hydrogen peroxide or other oxidizing agent may be used. The extent of the bleach may be regulated by adjusting the amount of the oxidizing agent. The amount of the hydrogen peroxide, for example, may be of the order of from 10-15% of the blood treated, but greater or much smaller amounts of hydrogen peroxide may be used as desired.

After the oxidizing treatment, the blood material may then be adjusted back to a substantially neutral pH by the addition of acid or alkali, as required. Then the liquid may be dried in any desired way, as by pan drying in a tunnel, or spray drying.

We have found that the protein products obtained by this improved process possess the same characteristics as to solubility and heat coagulability as has characterized the light albumin product produced by centrifuging to remove hemoglobin. In addition, by our process we preserve in the product the protein globin which has important adhesive characteristics as well as heat coagulability.

Following are specific examples illustrating how our invention may be practiced.

*Example I*

To 100 cc. of floor blood containing 13% total solids was added dilute hydrochloric acid until the pH became 3.2. About 5 cc. of 3N HCl was required. A drop of tributyl phosphate was added as a defoamer and the mixture subjected to mechanical agitation. A 13 cc. hydrogen peroxide solution of 30% strength was next slowly added by stirring, after which about 5 cc. of 28% ammonium hydroxide was added to bring the solution to about pH 7. The liquid was then spray dried.

*Example II*

To 100 cc. of floor blood containing 15% total solids was added 3 cc. of a 20% sodium hydroxide solution and the pH rose to 11.3. A small amount of tributyl phosphate was added as a defoamer and the mixture was placed under mechanical agitation. A 15 cc. hydrogen peroxide solution of 30% strength was slowly added. The bleached solution was still alkaline having a pH of about 9.5. To neutralize there was added 5 cc. of a 10% citric acid solution and about the same amount of mono sodium acid phosphate so that the final solution had a pH of about 7.0. This solution was then dried on a pan in a wind tunnel.

*Example III*

To 100 cc. of floor blood containing 14% total solids was added 1 cc. of ammonium hydroxide, causing the pH to rise to about 9.5. The blood thus adjusted as to pH was heated to 60° C. with agitation, and was then cooled to about room temperature and a drop of tributyl phosphate added as a defoamer. Agitation was continued while 10 cc. of a 30% hydrogen peroxide solution was slowly added. When the peroxide was all mixed in, the pH was about 8.1, and a citric-phosphoric acid mixture, similar to that described in Example II, was added to neutralize to about pH 7. The liquid was then spray dried.

The foregoing specific examples have been given for purposes of explanation only and are not to be taken in a limited sense, it being understood that our improvements may be practiced in varying ways, all within the spirit of the invention.

We claim:

1. A process comprising dissociating the heme from the globin of blood hemoglobin, and while the heme is thus dissociated subjecting it to the action of a peroxide.

2. A process comprising dissociating the heme from the globin of blood hemoglobin, and while the heme is thus dissociated, subjecting it to the action of hydrogen peroxide.

3. A process comprising adjusting the pH of hemoglobin to from 3.5-2.5 to dissociate the heme from the globin and subjecting the resulting heme while dissociated from the globin to the action of a peroxide.

4. A process comprising adjusting the pH of hemoglobin to from 11-12 to dissociate the heme from the globin, and subjecting the resulting heme while dissociated from globin to the action of a peroxide.

5. A process comprising adjusting the pH of hemoglobin to from 3.5-2.5 to dissociate the heme from the globin, heating the mixture thus adjusted as to pH to a temperature of from 55-65° C., and subjecting the resulting heme while dissociated from the globin to the action of a peroxide.

6. A process comprising adjusting the pH of hemoglobin to from 9-12 to dissociate the heme from the globin, heating the mixture thus adjusted as to pH to a temperature of 55–65° C., and subjecting the resulting heme while dissociated from globin to the action of a peroxide.

7. A process comprising heating hemoglobin to a temperature of from 55–65° C. to dissociate the heme from the globin, and subjecting the resulting heme while dissociated from the globin to the action of a peroxide.

8. A process comprising adding hydrochloric acid to hemoglobin in an amount necessary to reduce the pH to from 3.5–2.5 to dissociate the heme from the globin, and subjecting the resulting heme while dissociated from globin to the action of a peroxide.

9. A process comprising adjusting the pH of hemoglobin to from 3.5–2.5 to dissociate the heme from the globin, subjecting the resulting heme while dissociated from globin to the action of a peroxide, and again adjusting the pH of the material thus obtained to substantially neutralize the same.

10. A process comprising adjusting the pH of hemoglobin to a pH of 11–12 to dissociate the heme from the globin, subjecting the resulting heme while dissociated from the globin to the action of a peroxide, and adjusting the pH of the material so produced to substantially neutralize the same.

11. A blood product which has a Gardner liquid color standard reading not greater than 13 and which is made by dissociating the heme from the globin of blood hemoglobin, and while the heme is thus dissociated, subjecting it to the action of a peroxide.

HAVARD L. KEIL.
RAYMOND H. BORKENHAGEN.

REFERENCES CITED

The following references are of record in the file of this patent:

Van Slyke et al.; J. Biol. Chem., vol. 54 (1922), pages 481–506.

Anson et al.; J. Gen. Physiol., vol. 13 (1929–1930), pages 469–476.

Mathews; Physiological Chemistry, Williams and Wilkins Co., Baltimore (1939), pages 785–793.

Certificate of Correction

Patent No. 2,466,710.

April 12, 1949.

HAVARD L. KEIL ET AL.

It is hereby certified that error appears in the printed specification of the above numbered patent requiring correction as follows:

Column 3, line 1, for the words "side of" read *side by*;

and that the said Letters Patent should be read with this correction therein that the same may conform to the record of the case in the Patent Office.

Signed and sealed this 20th day of September, A. D. 1949.

[SEAL]

JOE E. DANIELS,
*Assistant Commissioner of Patents.*